Dec. 20, 1932.  N. R. LILLIG  1,891,563
BOLT AND NUT LOCK
Filed April 25, 1930
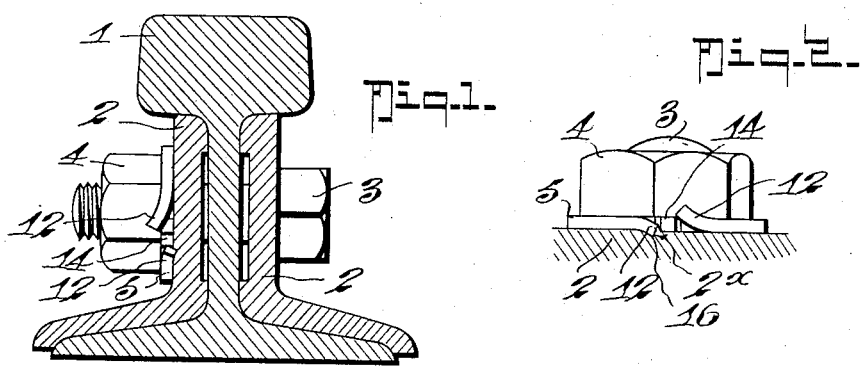
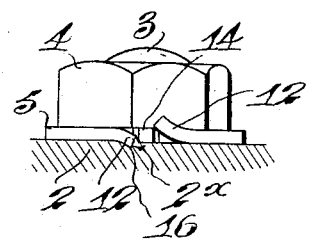
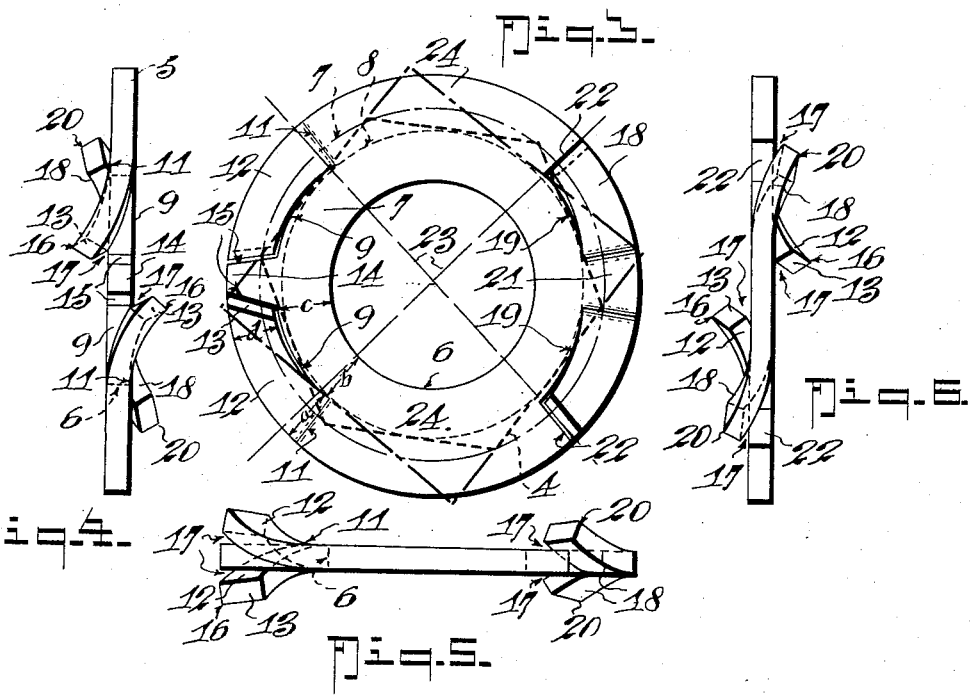
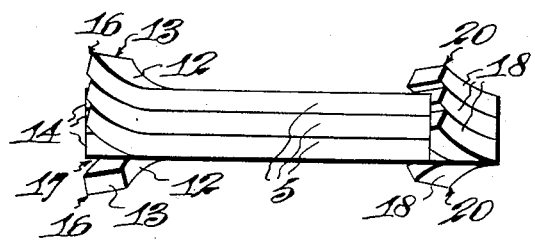
INVENTOR
Nicholas R. Lillig
BY
ATTORNEY Patented Dec. 20, 1932

1,891,563

UNITED STATES PATENT OFFICE

NICHOLAS RICHARD LILLIG, OF PORTLAND, OREGON, ASSIGNOR TO TICE LOCK-WASHER MANUFACTURING CO., OF PORTLAND, OREGON, A CORPORATION OF OREGON

BOLT AND NUT LOCK

Application filed April 25, 1930. Serial No. 447,331.

The present invention which relates to the art of lock washers particularly has for its object to improve the lock washer of the type disclosed in my application filed December 27, 1929, Serial No. 416,914 by providing means whereby a nut may be locked automatically even though a corner of the nut be lying over one of the locking jaws when the nut is fully screwed home.

Further, it is an object of the invention to provide a lock washer of the type referred to in which two sets of locking jaws are provided at diametrically opposite places of the washer, the locking ends of which, however, lie less than or more than 180° apart, thereby providing a lock washer which will lock a nut (either square or hexagon) in almost any position it may assume when fully screwed home, and whereby to accomplish this function with the fewest possible number of lugs per set.

Further, it is an object to provide a washer of the reversible kind which embodies the features aforesaid.

Further, the invention has for an object to provide a washer with an annulus unbroken in the general circular direction in which it extends and provided with spring jaws at its periphery and with means interposed between the proximate ends of a pair of adjacent jaws which will serve several functions, viz: to prevent tangling of the washers when they are stacked or packed together for shipment or when two or more washers are used as shims, to provide means to cooperate with the biting jaw and the material "plowed up", thereby to hold the washer against reverse movement beyond a slight amount necessary to dig in, and to provide a substantially continuous perimeter for the washer (which admits of advantageous manufacturing).

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawing, in which:—

Figure 1 is a vertical cross section of a rail structure with my invention applied.

Figure 2 is a slightly enlarged detail elevation of a washer and nut with the part against which the washer bears shown in cross section to illustrate how the biting jaw plows in.

Figure 3 is an enlarged face view of the washer.

Figure 4 is an edge view of the same looking from left to right in Figure 3.

Figure 5 is an edge view of the same looking from bottom to top in Figure 3.

Figure 6 is an edge view of the washer shown in Figure 3 showing the second set of jaws whose fixed ends are in proximity.

Figure 7 is an edge view of several washers showing how they stack without interlocking.

In the drawing in which like numerals and letters of reference indicate like parts in all of the figures, 1 represents the rail, 2 the fish plates, 3 the bolt and 4 the nut while 5 indicates the washer which constitutes the subject matter of my present invention.

The washer 5 consists of a disk provided with a bolt hole 6. The disk is provided with two slits 9 preferably arranged somewhat eccentrically to the bolt hole 6 and leaving between the slits and the bolt hole an annulus 7 which is unbroken in the general circular direction in which it extends. The slits 9 join with outwardly converging slits 15 leaving between the slits 15 a tongue 14 that lies in the general plane of the annulus 7 at all times.

The slits 9 are preferably eccentric so as to provide a somewhat wider space ($a$) from the slit to the periphery of the washer at its inner end than the distance ($b$) from the same slit end to the bolt hole, thereby providing jaws 12 which are integral with the annulus and are of greater width at the base ($a$) than at the free ends ($d$), the distance ($d$) being less than the distance ($e$) thus giving greater strength to the jaws than would be the case were they of the same width at the base as at the free end.

The inscribed circle of the nuts 4, i. e. the lesser diameter, is indicated by the light dotted line 8 in Figure 3, a hexagonal nut being indicated in Figure 3 by heavy dotted lines and a square nut by heavy dot and dash lines, the maximum diameter or the circumscribed circle of the hexagonal nut being indicated by the light dot and dash line 7.

The jaws 12 are off-set to opposite sides of the plane of the annulus 7, the inclination of the jaws to the annulus being gradual from the base or inner ends to a point approximately that indicated by 11 from which they are given a more abrupt bend in order to bring the free ends 13 of the jaws to one side of the plane of the annulus 7 and of the tongue 14. It is to be noted, too, that this produces bevelled end faces 13 as it were leaving the points 16 farthest from the plane of the annulus. These points are the plowing or digging in points of the jaws.

It will also be noted that the spaces indicated at 17 in Figures 3 and 5 between the ends of the jaws and the adjacent faces of the annulus 7 are less than the thickness of the annulus or of the jaws. The purpose of this is to prevent the jaws of one washer from interlocking or tangling with the jaws of another washer laid against it as indicated in Figure 6, since one jaw of each washer will engage the tongue of the other washer (on opposite sides) and enable the washers to nest perfectly without interlocking.

Furthermore by converging the slits 15 from the slits 9 outwardly the digging in or plowing points 16 are located at the extreme periphery of the washer and when the nut is screwed home and the jaw 12 digs in (see Figure 2), the shavings or material 2$^x$ plowed up will work in between the face 13 and the adjacent face of the tongue 14 as a wedge and stop further movement of the washer backwards.

It should, of course, be understood that the material of which the washers 5 are made is such that it may be tempered and the jaws 12 become stiff spring jaws so that they will not snap off when bent back into the plane of the washer as a whole.

It is also to be observed that the slits 9 from about the bend 11 to the free ends of the jaws lie to the outside of the minor diameter of the nut with which the washer is to be employed and they lie also well within the major diameter of the nut, see Figure 3. The purpose of this is to enable the jaw 12 which is adjacent the nut to spring up against the side face or flat of the nut, see Figures 1 and 2, and thereby hold the nut against being turned off while a corner or angle of the nut will overlie a portion of the tongue 14 and project over a portion of the free end of the biting under jaw 12.

By providing the tongue 14 the space between the ends of the jaws is reduced in such manner as greatly to facilitate the stacking of the washers for shipment; and also, when in use, to cooperate with the biting jaw to effect a grip on the fish plate 2 or other part into which the biting jaw digs so as to stop the backward rotation of the nut in the smallest distance possible.

With washers of the type disclosed in the application aforesaid, there is a considerable space between the ends of the jaws and therefore it sometimes happens that in slacking off a nut under which such washer is placed the bottom jaw digs into the piece which has been fastened. In moving backwards the jaw pushes in front of it an ever-increasing accumulation of metal until it has dug in sufficiently to stop its backward motion. This digging in of the washers is sometimes so great that unless the jaw is pried up by hand or chiseled off it must be broken in order to loosen the nut. This applies to the old style lock washers without the tongue 14. With the present washer having the tongue 14 it is found that the accumulation of the plowed up material does not have to be nearly so great in order to stop the reverse movement of the washer as the plowed pieces lodge between the jaw 12 and the tongue 14 as before described. This makes the digging in process more positive and it becomes effective in but a fraction of the space required in the old style washer.

It is to be noted that the jaws 12—12 face one another, i. e. they have their free ends adjacent. A second set of jaws 18—18 is provided by slitting the washer as at 19 and 22, one jaw 18 being deflected from one face of the washer while the other jaw 18 is deflected from the other face of the washer. The jaws 18, unlike the jaws 12, do not face one another at their free ends but have those ends extended away from one another, the fixed ends of the jaws being in proximity and leaving an unbroken area 21 between the fixed or attached ends of the jaws 18 which is located 180° from the tongue 14.

Each pair of jaws 12—12 and 18—18 occupies approximately 90° of the circumference of the washer at diametrically opposite extremities, thus leaving two areas 24 between the pairs of jaws which are located 180° apart and are unbroken.

Diameters 23 drawn through the slits 22 and 90° apart intersect the inner ends of the slits 9 as shown in Figure 3.

The jaws 18 are so bent as to present digging-in points 20 similar to the points 16.

By the use of my present washer, should the nut when screwed home have one of its points or corners overlying the locking jaw 12 for instance, then the locking jaw 18 will be free to spring up and function, and vice versa.

By reversing the direction of the pair of jaws 18 from that of the jaws 12, the locking jaws (top) 12—18 and the biting jaws (bottom) 12—18 will lie with their ends less than or more than 180° apart, thus functioning properly with either square or hexagonal nuts and regardless of which face of the washer is opposed to the nut.

From the foregoing description, taken in connection with the accompanying drawing, it is thought the construction, functions and advantages of the present invention will be clear to those skilled in the art, and I desire it further understood that the drawing illustrates and the description describes a preferred embodiment of the invention, and that modifications of the same may be made within the spirit of the invention and the scope of the appended claims, and I therefore do not desire to be understood as limited to the specific embodiment of the invention shown and described.

What I claim is:

1. A lock washer comprising a disk having a bolt hole surrounded by a continuous annular body which is provided with a pair of longitudinal slits merging with outwardly extending slits at the proximate ends of said longitudinal slits, thereby defining a pair of jaws and a tongue located between the proximate ends of said jaws and separated therefrom, said jaws being offset from opposite faces of said disk whereby the ends lie a distance beyond said faces, said jaws and said tongue together extending through an arc of ninety degrees, said disk having a second pair of longitudinal slits merging with outwardly extending slits at the remote ends of said longitudinal slits, thereby defining a second pair of jaws, and a tongue-like portion located between the proximate ends of said jaws and integral therewith, said second pair of jaws being offset from opposite faces of said disk whereby their free ends lie a distance beyond said faces, said second pair of jaws and said tongue-like portion together extending through an arc of ninety degrees and diametrically opposite the first mentioned arc, the remaining 180 degrees of the washer disk being uninterrupted and said jaws lying a greater distance from the center of the disk than the lesser diameter of the nut with which the washer is to be used and lying a lesser distance from the center of the disk than the maximum diameter of the said nut.

2. A lock washer comprising a disk having a bolt hole surrounded by a continuous annular body which is provided with a pair of longitudinal slits merging with outwardly extending slits at the proximate ends of said longitudinal slits, thereby defining a pair of jaws and a tongue located between the proximate ends of said jaws and separated therefrom, said jaws being offset from opposite faces of said disk whereby the ends lie a distance beyond said faces, said jaws and said tongue together extending through an arc of ninety degrees, said disk having a second pair of longitudinal slits merging with outwardly extending slits at the remote ends of said longitudinal slits, thereby defining a second pair of jaws, and a tongue-like portion located between the proximate ends of said jaws and integral therewith, said second pair of jaws being offset from opposite faces of said disk whereby their free ends lie a distance beyond said faces, said second pair of jaws and said tongue-like portion together extending through an arc of ninety degrees and diametrically opposite the first mentioned arc, the width of said tongue when measured nearest the hole and the width of the said tongue-like portion measured nearest the hole being approximately equal, thereby defining tongues of substantially equal sizes, the remaining 180 degrees of the washer disk being uninterrupted and said jaws lying a greater distance from the center of the disk than the lesser diameter of the nut with which the washer is to be used and lying a lesser distance from the center of the disk than the maximum diameter of the said nut.

N. RICHARD LILLIG.